United States Patent
Felter et al.

(10) Patent No.: US 7,400,585 B2
(45) Date of Patent: Jul. 15, 2008

(54) OPTIMAL INTERCONNECT UTILIZATION IN A DATA PROCESSING NETWORK

(75) Inventors: Wesley Michael Felter, Austin, TX (US); Orran Yaakov Krieger, Newton, MA (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 10/948,414

(22) Filed: Sep. 23, 2004

(65) Prior Publication Data

US 2006/0062150 A1    Mar. 23, 2006

(51) Int. Cl.
*H04L 12/56* (2006.01)

(52) U.S. Cl. .................................. 370/235
(58) Field of Classification Search .............. None
See application file for complete search history.

(56) References Cited

U.S. PATENT DOCUMENTS

| | | | |
|---|---|---|---|
| 5,539,883 A * | 7/1996 | Allon et al. | 370/237 |
| 6,760,314 B1 * | 7/2004 | Iwata | 370/254 |
| 6,941,252 B2 * | 9/2005 | Nelson et al. | 370/509 |
| 7,027,448 B2 * | 4/2006 | Feldmann et al. | 370/401 |
| 2004/0008697 A1 * | 1/2004 | Millard et al. | 370/397 |
| 2005/0185587 A1 * | 8/2005 | Klinker | 370/237 |

* cited by examiner

*Primary Examiner*—Anh-Vu H Ly
(74) *Attorney, Agent, or Firm*—Casimar K. Salys; Dillon & Yudell LLP (57) ABSTRACT

A method for managing packet traffic in a data processing network includes collecting data indicative of the amount of packet traffic traversing each of the links in the network's interconnect. The collected data includes source and destination information indicative of the source and destination of corresponding packets. A heavily used links are then identified from the collected data. Packet data associated with the heavily used link is then analyzed to identify a packet source and packet destination combination that is a significant contributor to the packet traffic on the heavily used link. In response, a process associated with the identified packet source and packet destination combination is migrated, such as to another node of the network, to reduce the traffic on the heavily used link. In one embodiment, an agent installed on each interconnect switch collects the packet data for interconnect links connected to the switch.

1 Claim, 6 Drawing Sheets

OPTIMAL INTERCONNECT UTILIZATION IN A DATA PROCESSING NETWORK

This invention was made with Government support under NBCHC020056 awarded by PERCS phase 1. THE GOVERNMENT HAS CERTAIN RIGHTS IN THIS INVENTION.

BACKGROUND

1. Field of the Present Invention

The present invention is in the field of data processing networks and more particularly to managing the routing of network packets in multiprocessor networks.

2. History of Related Art

In a multiprocessor system where multiple nodes are interconnected through an interconnect, the interconnect can be used to transfer a variety of data including data related to computation as well as data related to I/O requirements. In a conventional network, where no special attention is paid to the mapping between processes or threads and their corresponding nodes, the utilization of the system interconnect may be less than optimal. Certain physical links within the interconnect may used extensively while others are used scarcely. If the number of packets traversing the more heavily used links approaches the bandwidth limitations of the link, network performance or response time may degrade under circumstances where there may be ample bandwidth on other links. It would be desirable to implement methods, systems, and networks that could migrate processes when interconnect usage becomes unbalanced to distribute packets over physical links more equitably.

If the network consists of a relatively few number of nodes and interconnect links, the task of determining which, if any, processes might beneficially be migrated may be quite manageable. As the number of nodes and interconnect links increases, however, the difficult of identifying and correcting undesirable interconnect usage patterns increases dramatically. Any system or technique attempting to address unbalanced network utilization should, therefore, be scaleable such that the solution is relatively indifferent to the number of nodes and the number of switches within the interconnect itself.

SUMMARY OF THE INVENTION

The identified objectives are achieved through a method for managing packet traffic in a data processing network according to the present invention. The method includes collecting data indicative of the amount of packet traffic traversing each of the links in the network's interconnect. The collected data includes source and destination information indicative of the source and destination of corresponding packets. A set of heavily used links is then identified from the collected data. Packet data associated with the heavily used link is then analyzed to identify a packet source and packet destination combination that is a significant contributor to the packet traffic on the heavily used link. In response, a process associated with the identified packet source and packet destination combination is migrated, such as to another node of the network, to reduce the traffic on the heavily used link. In one embodiment, an agent installed on each interconnect switch collects the packet data for interconnect links connected to the switch. The agent generates a data table for each link being monitored. The data table includes an entry for each packet traversing the link during a monitored period. Each entry includes source and destination information associated with the corresponding packet. The source information may identify a source node of the network and the destination information may identify a destination node. Migrating a process associated with a particular source and destination combination may include migrating the process to a different source node where a path connecting the different source node and the destination node does not include the heavily used link.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention is directed towards a multiprocessor data processing network and method for optimizing usage of the network's interconnect to prevent or reduce the occurrence of performance degradation resulting from over utilization of a relatively small number of physical interconnect links. The invention manages packet traffic within the network to distribute the packet traffic load such that no link carries significantly more traffic than its peers. To accomplish this objective, interconnect traffic is monitored and classified into various groups where each grouped is tagged by the source and destination identifiers. This information is periodically reported to system software. The system software assembles the "local" statistics provided by each interconnect switch into a global view of source-destination communication over the bottleneck links. For all source-destination pairs traversing these links, the system software alters the process-to-node mapping such that the traffic gets routed across another link.

Figure 1:
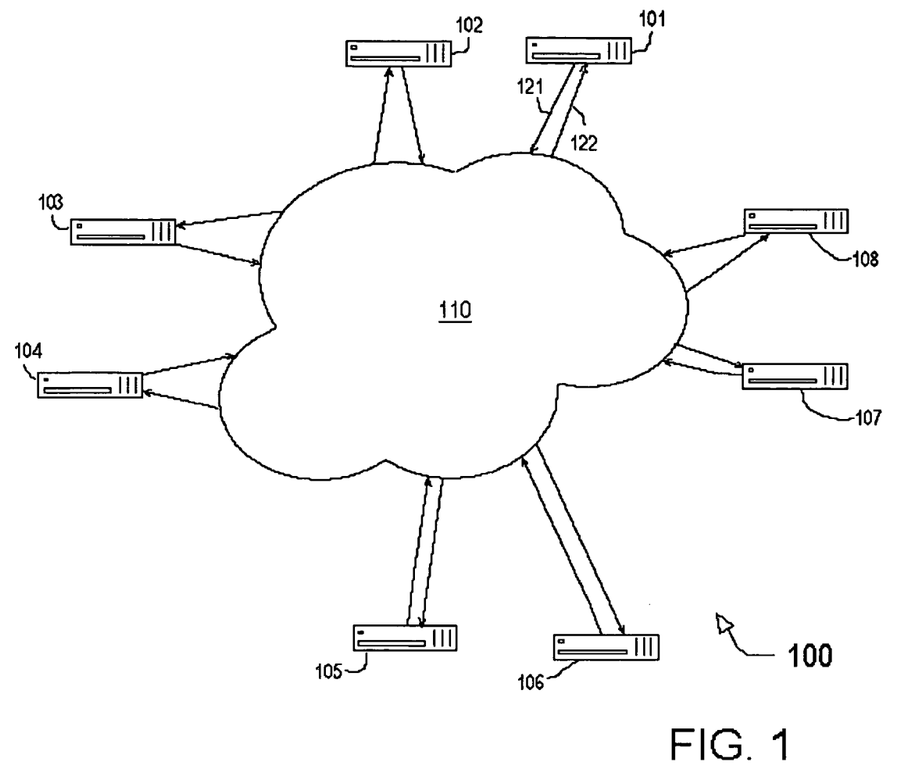
FIG. 1 is a diagram of selected elements of a data processing network according to an embodiment of the present invention.

Referring now to the drawings, FIG. 1 illustrates selected elements of a data processing network 100 according to an embodiment of the present invention. Network 100 may be characterized as a multiprocessing network in which two or more processors cooperate to provide a particular functionality or perform a specific task. In a web center application, for example, the systems that comprise network 100 may collectively provide a web site or other web-accessible service to users. Network 100 could also provide a database service or a specific application. In this context, network 100 may, itself serve as a node within a larger network such as the Internet.

As depicted in FIG. 1, network 100 includes a plurality of data processing systems 101-108, also referred to herein as nodes 101-108, interconnected via an interconnect 110. As shown in FIG. 1, each node 101-108 is connected to interconnect 110 with a pair of logical connections. A first connection 121 (shown with respect to node 101) between a node and interconnect 110 conveys messages from other nodes while a second connection 122 between the node and the interconnect conveys messages to other nodes via interconnect 110. First and second connections 121 and 122 are depicted in FIG. 1 as distinct to emphasize their different functions in the context of the present application, but it should be noted that connections 121 and 122 may be implemented using a common physical link or connection.

Figure 4:
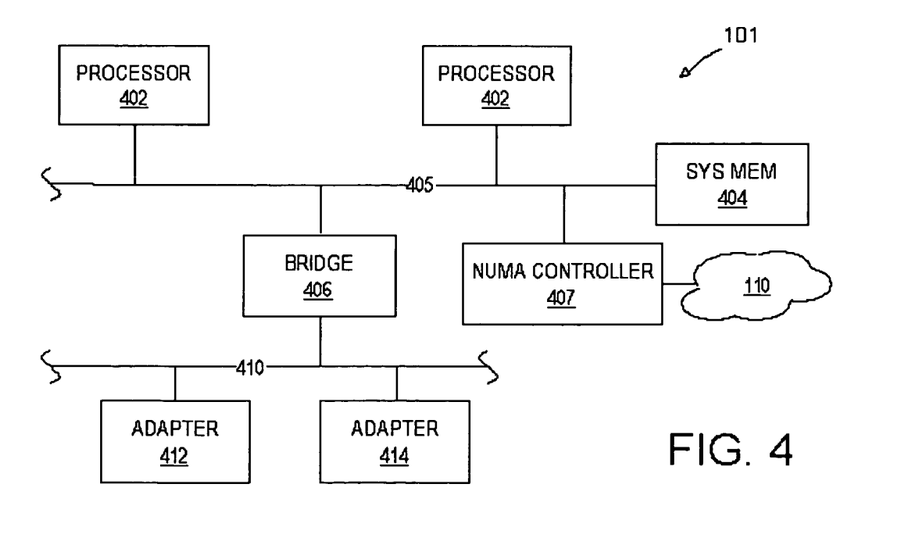
FIG. 4 is a diagram of selected elements of one implementation of the network nodes of FIG. 1.

In one embodiment, nodes 101-108 all contain substantially equivalent hardware and system software. As depicted in FIG. 4, each node 101-108 includes one or more general purpose microprocessors 402 that have access to a system memory 404 that is shared among microprocessors 402 via a shared system bus 405. Each node 101-108 may further include a bridge 406 that provides an interface between system bus 405 and a peripheral bus 410 to which one or more peripheral adapters such as adapters 412 and 414 are connected. The peripheral adapters of nodes 101-108 may include, as common examples, a network interface adapter and a hard disk controller providing access to persistent storage within the system.

In one embodiment, network 100 is characterized as having a cache coherent, non-uniform memory architecture (NUMA). In a NUMA system, the processors of a particular node have "local" access to node's system memory. Processors have "remote" access to the system memory of other nodes on network 100. The memory architecture is said to be non-uniform because the latency associated with local access is lower than the latency associated with remote access. In a NUMA implementation of network 100, interconnect 110 of FIG. 1 may be connected directly to the system bus 405 of each node 101 through an intervening controller (as opposed to conventional LAN's in which the LAN nodes communicate via an adapter connected to a peripheral or I/O bus).

Figure 2:
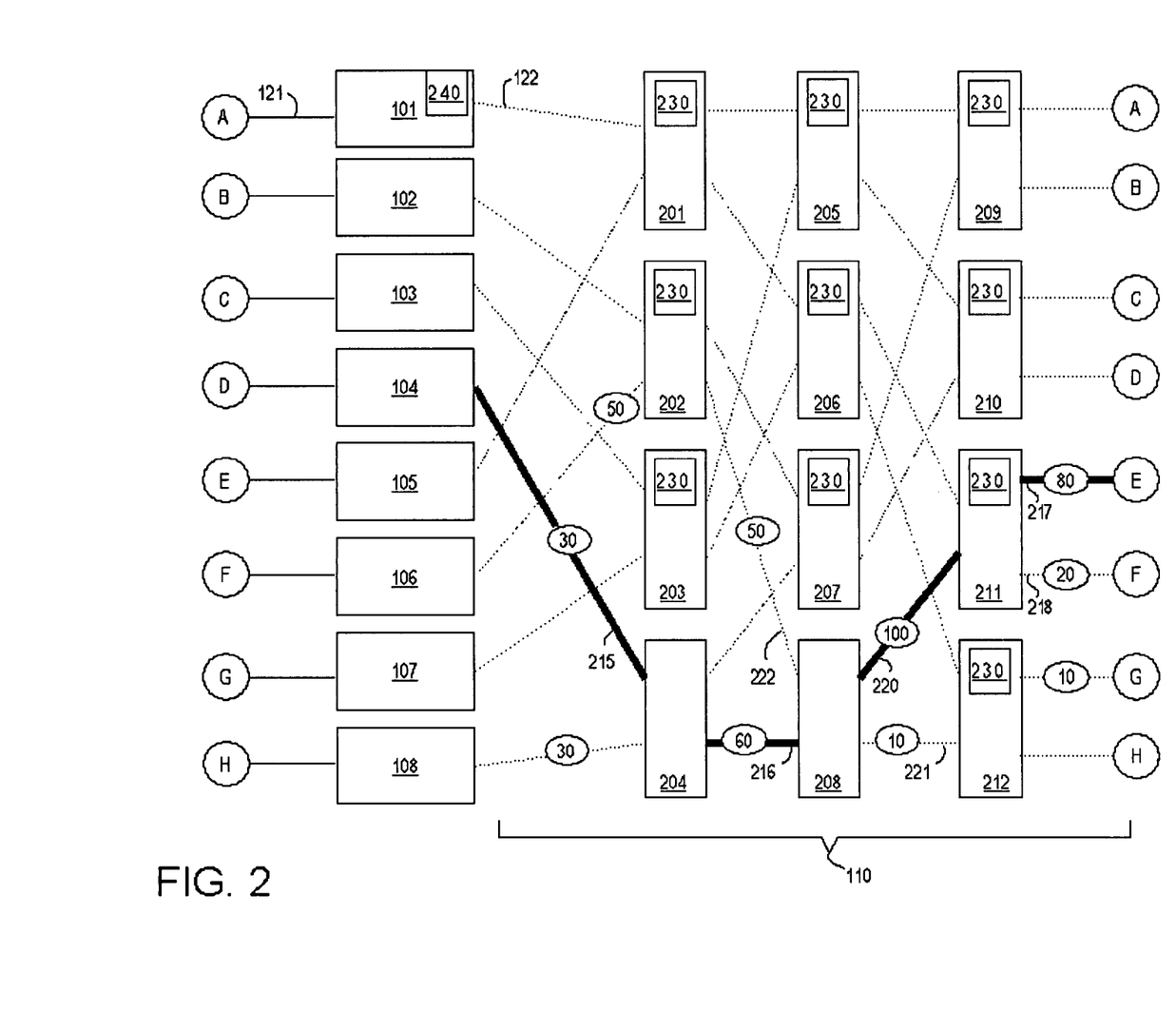
FIG. 2 is a diagram illustrating additional detail of an implementation of the data processing network of FIG. 1.

Referring now to FIG. 2, network 100 of FIG. 1 is illustrated with additional detail emphasizing the structure of interconnect 110. In the implementation depicted in FIG. 2, interconnect 110 includes a set of switches 201-212 that interconnect nodes 101-108 such that there is a unique path from each node to each other node. Each of the switches 201-212 receives input from two devices and provides output to two other devices. Thus, each switch can route messages from either of two devices to either of two output devices. The devices to which a switch can be connected include a node or another switch. The connections leading to and from each switch are referred to herein as interconnect links or simply links. Thus, each link connects one interconnect device to one other interconnect device.

Although the depicted implementation shows a specific number of nodes and switches and each switch is shown as providing a connection between two input devices (the devices to the left of the switch) and two output devices (the devices to the right of the switch), other implementations, including implementations with many more nodes and switches and having switches of greater complexity (i.e., switches interconnecting three or more input devices to three or more output devices) are encompassed by the present invention. The depicted implementation is presented to convey the inventive concepts in the context of a relatively manageable network.

To illustrate the present invention, network 100 is shown in FIG. 2 at a point in time when some network packets have been or are being across interconnect 110. The nodes from which packets originate are referred to as source nodes while the nodes to which packets are sent are referred to as the destination nodes. For the sake of clarity, the interconnect links traversed by the exemplary packets are shown in solid lines while the remaining links are shown as dotted lines. The number of packets traversing each link is indicated by number within the ovals that are imposed over each link of interest.

The illustrated example depicts node 104 sending 30 packets to node 105, node 106 sending 50 packets to node 105, and node 108 sending 20 packets to node 106 and 10 packets to node 107. The 30 packets sent by node 104, for example, traverse the link 215 from node 104 to switch 204. Switch 204, based on destination information contained in each packet, routes these 30 packets (as well as 30 other packets received from node 108) to switch 208 via link 216. Switch 208, in turn, routes 50 of the packets received from switch 204 (as well as 50 packets received from switch 202 for a total of 100 packets) to switch 211 via link 220. Finally, switch 211 routes 80 packets (including the 30 packets from node 104) to node 105 over link 217 (and 20 packets to node 106 via link 218). Each of the packets sent across interconnect 110 includes, at a minimum, a source identifier and a destination identifier. In this simplified illustration, for example, it is observed that 100 packets have been sent over link 220 from switch 208 to switch 211 while none of the remaining links has carried more than 80 packets and many links have not carried any packets at all.

The present invention is concerned with generating data that enables the system to identify heavily used links such as link 220 and then to migrate one or more processes suspected of contributing to the usage of a heavily used link in a way that reduces the packet loading on the link (e.g., by migrating the process to a node from which the path to the specified destination does not traverse the heavily used link). An advantage of the present invention is its scalability. Specifically, the present invention is implemented such that the complexity of identifying heavily used links increases only linearly with an increase in the number of nodes and switches. This benefit is achieved by gathering packet data at each switch. In contrast, a method that attempts to determine heavily used links by evaluating packets solely in terms of their source node and destination node will increase in complexity exponentially as the number of nodes and switches increases.

Portions of the present invention may be implemented as a sequence or set of computer executable instructions (computer software) stored on a computer readable medium. The computer readable medium may be a persistent storage medium such as a hard disk, a read only memory (ROM) device, a CD or DVD disc, a magnetic tape, or the like. During execution, portions of the software may reside in a volatile storage medium such as a DRAM system memory or an SRAM cache memory. In one such embodiment, the computer software provides functionality enabling data processing network such as network 100 of FIG. 1 to optimize usage of its network links.

Figure 3:
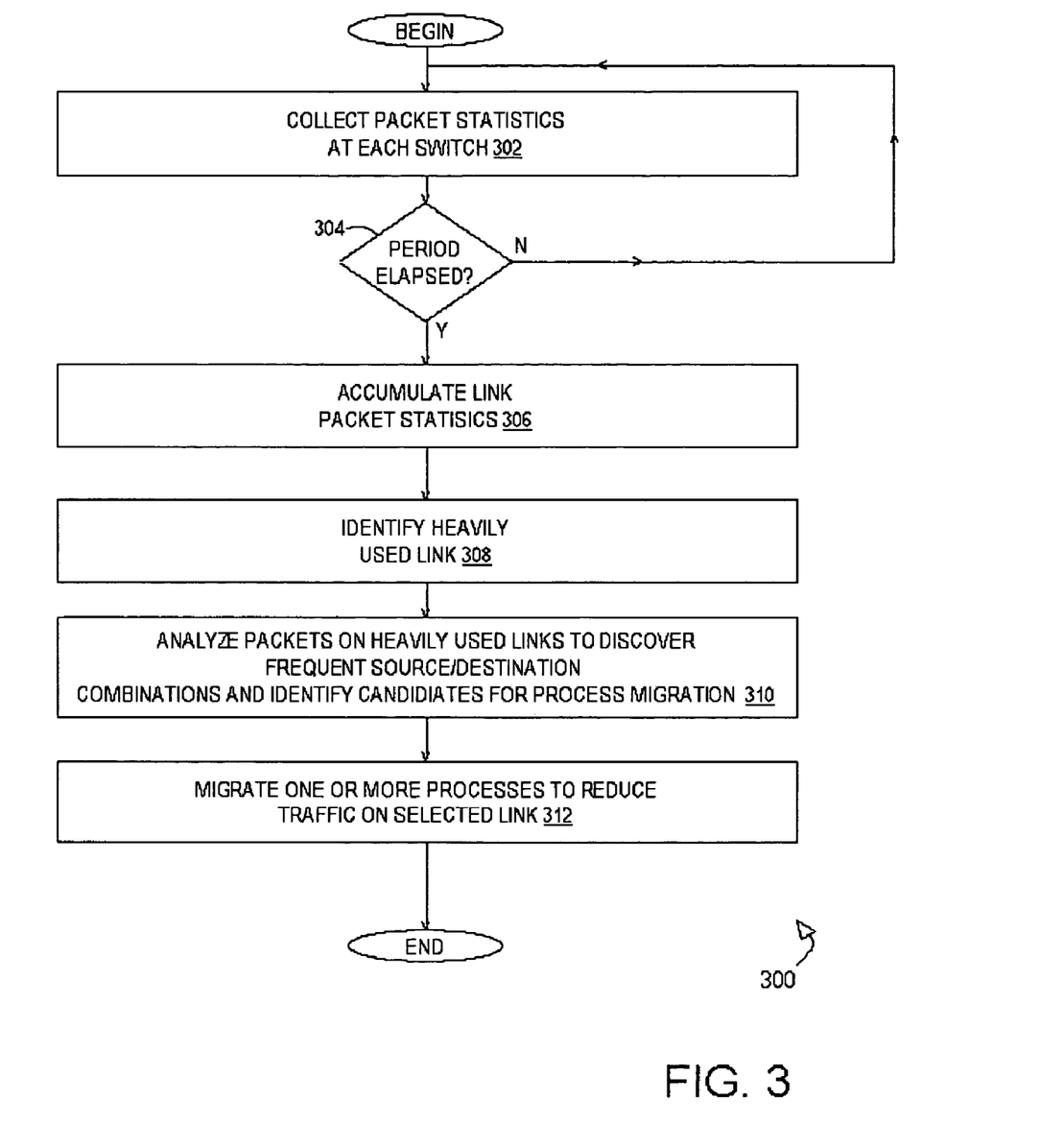
FIG. 3 is a flow diagram illustrating an implementation of a method and software code suitable for distributing processes to network nodes to minimize network and interconnect bottlenecks.
Figure 5:
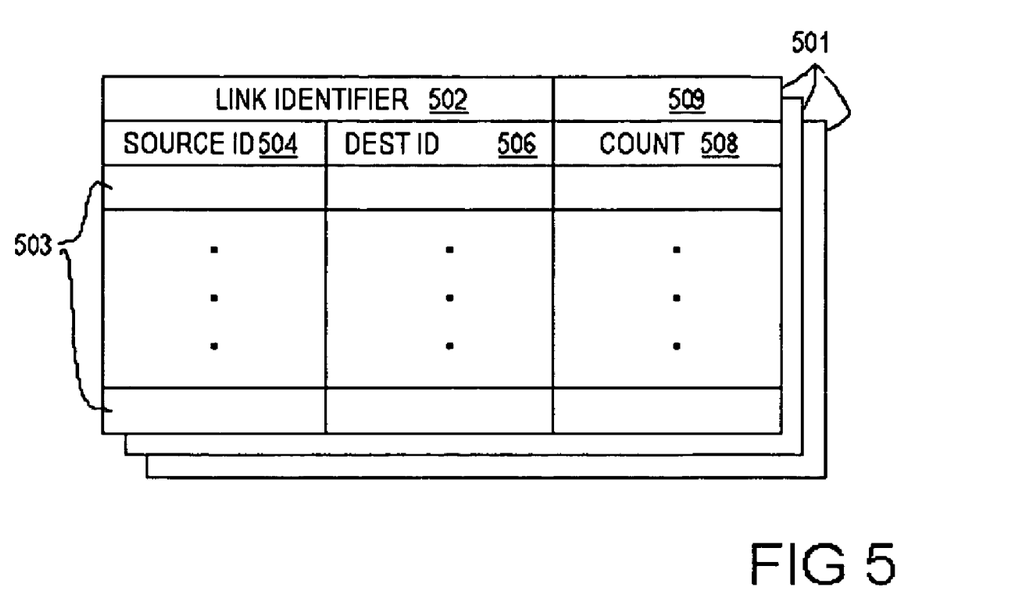
FIG. 5 is a conceptual representation of a data table suitable for use with an embodiment of the present invention.

Referring to FIG. 3, a flow diagram of a method 300 of mapping executing processes or threads to data processing nodes according to one embodiment of the present invention is depicted. In the depicted embodiment, method 300 includes collecting (block 302) packet statistics at each switch in a network interconnect such as interconnect 110 of FIG. 2. Referring momentarily to FIG. 5, a conceptual representation of the statistics gathered for each interconnect link according to one implementation is presented. In this conceptual representation, a database or table 501 is created and maintained for each link (such as link 220) of interconnect 110 (FIG. 2).

Each switch 201 through 212 includes sufficient resources and functionality to maintain a table such as table 501 for each link to which the switch is connected. To conserve resource usage, most switches are only required to track the link(s) connected to their output(s) or the link(s) connected to their input(s). If, for example with respect to FIG. 2, each switch maintains statistics for the links connected to its inputs, it should be evident that the only links not being tracked include the links connected to the outputs of switches 209 through 212. Similarly, if each switch maintains statistics for its output links, the only links not being track are the input links for switches 201 through 204. To achieve complete coverage of the interconnect usage patterns, some subset of the switches must maintain data for their input and output link. The determination of which links are tracked by each switch is preferably determined by system software that is aware of the configuration of network 100 and interconnect 110.

Thus, each switch, according to one embodiment, includes an agent (typically implemented in software or firmware) capable of tracking packets that are processed by or pass through the corresponding switch. These packet tracking software agents are represented in FIG. 2 as executable software code identified by reference numeral 230 (agent 230 has been omitted from some of the switches for the sake of clarity). Referring back to FIG. 5, the tables 501 maintained by these switch agents include a link identifier 502 and a set of entries 503. Each entry 503 includes a source identifier 504 and destination identifier 506.

Each packet traversing interconnect 110 includes, at a minimum, an indication of the packet's source and its destination. The source and destination may be identified by an executing process or thread, a processing node, or both. Each entry further includes a count 508 that indicates, as its name implies, the number of occurrences of packets on the corresponding link having the source and destination identifiers associated with the entry 503. A total count 509 of all count values 508 is also maintained in the depicted embodiment of each table 501.

Thus, tables 501 provide information indicative of the number of packets traversing a particular link as well as information about the source and destination of those packets. Referring back to FIG. 3, packet statistics are gathered and maintained for a specified duration or period. System software then determines (block 304) whether the current period has elapsed and, if not, packet statistic collection is continued by the agents on each switch. If the specified period has elapsed, the packets statistics in each table 501 are collected or accumulated (block 306) by the system software into a cumulative database. The system software references to application or operating system code that resides on one or more of the network nodes. In FIG. 2, the system software referred to within this disclosure is installed on node 101 and identified by reference numeral 240. It will be appreciated that system software 240 may be installed on any other network node and may be a distributed application that is installed on multiple nodes.

System software 240 then identifies or selects (block 308) those links within interconnect 110 that are considered heavily used links. The determination of which links are heavily used is implementation specific, but is typically made based on the total number of packets that have been sent across a link. The determination may be based on some specified threshold (e.g., the number of packets exceeds K), on a comparative scale (e.g., the number of packets is at least 10% greater than the number of packets on any other link), or on a combination of the two.

After identifying the heavily used links, the system software analyzes (block 310) the packets traversing the link to identify combinations of source and destination identifiers that occur frequently. Source/destination combinations that occur frequently identify processes or threads that are candidates for migration. Migration candidates represent processes that, if migrated to a different source and/or destination, might result in reduced packet traffic on the heavily used link. For example, if the source identifier for a frequently occurring source/destination combination indicates a particular process that is mapped to a particular node, the indicted process may be a candidate for migration to another node. In this context, migration implies a process in which system software re-maps the process to an alternative node. To achieve the desired reduction in packet traffic on the heavily used interconnect link, the process is remapped to a node from which packets may be sent to the destination using an interconnect path that does not include the heavily used link.

Referring back to FIG. 2, for example, the analysis of the per-link packet data would identify link 220 as a heavily used or bottle neck link. Further analysis of the packet data corresponding to link 220 would reveal that the combination of node 106 as a source and node 105 as a destination accounts for 50 of the 100 packets observed on link 220. In response, system software would then identify a process executing on node 106 as a candidate for migration. The system software is aware of the configuration of interconnect 110 and knows, therefore, to which the candidate process might be migrated. Specifically, the system software attempts to migrate the candidate process to a source node to reduce packet traffic on the heavily used link without creating a different heavily used link in the process. In FIG. 2, these objectives might be achieved by migrating a process executing on node 106 to node 101. Packets destined for node 105 that originate from node 101 must traverse switches 201, 206, and 211 to arrive at node 105. The links associated with this switching path do not include link 220 nor does it include any other link on which significant traffic is observed. In this case, migration of a processor from node 106 to node 101 might reduce the traffic on link 220 without overloading any of the remaining links. By eliminating the bottle neck link and distributing the load that contribute to the overloading the present invention achieves effective management of packet traffic.

The implementation described above relies on each packet having source/destination information (i.e., information indicative of the source node and destination node of each packet). While this implementation has great utility in network configurations that are not excessively complex, it may have scalability limitations. More specifically, as the number of nodes increases, the task of maintaining packet information that is indexed by source and destination nodes increases in complexity exponentially. For very large networks with hundreds or thousands of nodes, one can appreciate that maintaining packet information in the manner described above with respect to FIG. 5 may become inefficient or unworkable (i.e., the switches might not have sufficient storage or processing capability to maintain the packet information as described above).

Addressing this potential scalability problem, one embodiment of the invention maintains a reduced or simplified set of packet information and relies on system software, having knowledge of the network configuration, to identify the possible source/destination combinations that are the most likely contributors to any bottleneck links. By greatly simplifying the packet information maintained for each link, this embodiment fully embraces the concept of scalability. Even as the number of nodes, switches, and links in the network increases, the packet information maintained by any individual link remains substantially the same.

Figure 7:
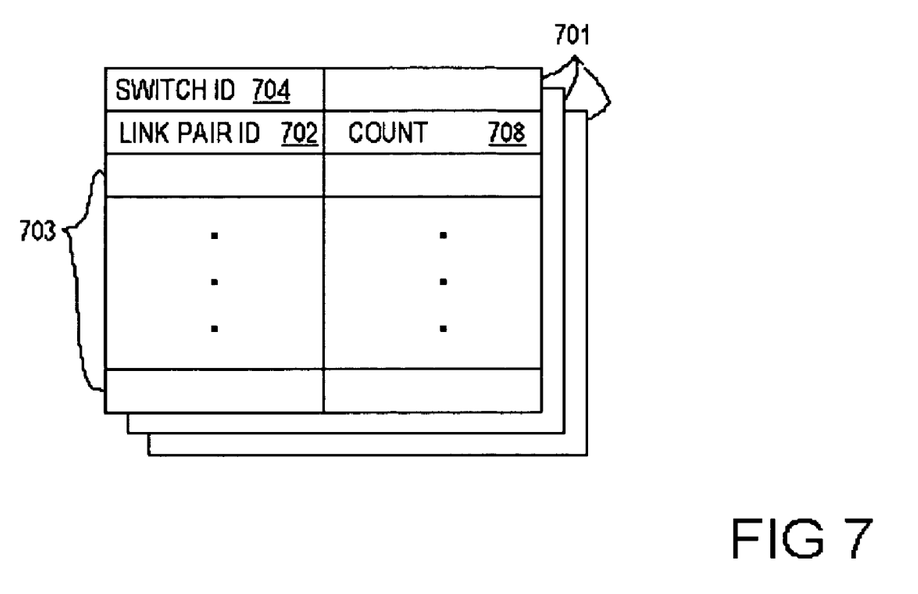
FIG. 7 is a conceptual representation of a data table suitable for use with one embodiment of the present invention.

Referring now to FIG. 7, an implementation of tables 701, analogous to tables 501 described above, maintained by the switch agents according to the embodiment under consideration is depicted. In the depicted implementation, each table 701 represents a file corresponding to one of the switches 201-212 and includes information 704 that identifies the switch. Alternatively, information 704 is omitted and the switch associated with each table 701 is indicated by the filename of file location.

In the implementation under consideration, each entry 703 corresponds to a "link pair" and each entry 703 includes information 702 identifying the link pair and count information 708 indicating the number of packets that have traversed the corresponding link pair (i.e., the link pair identified by information 702) since the time when information 708 was last cleared. A link pair is a unique combination of an input link and an output link. If, for example, a switch connects to two input links and two output links, there are four unique links pairs associated with the switch.

With respect to the illustration presented in FIG. 2, for example, a table 701 corresponding to switch 208, which has been allocated responsibility for tracking packets on link-pairs 222/220, 222/221, 216/220, and 216/221, will include a first entry 703 for link pair 222/220, a second entry 703 for link-pair 222/221, and so on. Moreover, the first entry 703 for link-pair 222/220 will include a count value 708 of 50 reflecting the number of packets passed from link 222 to link 220 and second entry 703 will include a count value 708 of 0 reflecting that no packets are passed from link 222 to 221. Similarly, the entries for link-pairs 216/220 and 216/221 would be 50 and 10 respectively. Significantly, table 701 does not include source node/destination node information. Instead of determining each packet's source node and destination node and then determining which table entry to increment, which may require an undesirably long time and an undesirably large amount of storage space within the switch, each switch need only determine that a packet has traversed one of its link pairs, index table 701 according to the link pair in question, and increment the count information 708 for that entry. It will be appreciated that the amount of processing required to record the appropriate information in table 701 as depicted and described with respect to FIG. 7 is substantially less than the time required to process each packet traversing a switch implemented according to the embodiment depicted in FIG. 5. This is especially true in large network having many nodes.

With the packet monitoring and tracking implemented according to FIG. 7, additional processing at a system level is required to identify processes that are candidates for migration. In this embodiment, software having knowledge or access to the network configuration uses the packet information stored in tables 701 on each network switch to determine the most likely source-to-destination path for packets that traverse a bottleneck link or any other link exhibiting significant traffic. Bottleneck links are identified by adding the appropriate link pair counts to get individual link packet counts (for instance, the entry for link-pair 222/220 and link-pair 216/220 in the table for switch 208 are added to obtain the packet count for link 220). Having thus identified likely source to destination paths, the software then selects and migrates one or more processes associated with the source and destination nodes. Migration may include re-mapping the association between a process and the node on which the process executes. Migration is preferably to a node from which the processes, when it generates traffic for the destination node, traverses a network switch and link path that does not include a bottleneck link. An advantage of this implementation is the significantly reduced processing and/or database management required of the switches 201-212. Each switch according to this implementation simply tracks the number of packets traveling over each link-pair for which the switch is responsible without regard to the original source or ultimate destination of each packet. An ancillary benefit to this approach is that the switch agents are blind to network configuration alterations. If nodes and/or switches and links are added or removed, the local tracking of link-pair count information at each switch 201-212 remains unchanged. Only system software 240 (FIG. 2) need be aware of network changes.

Figure 6:
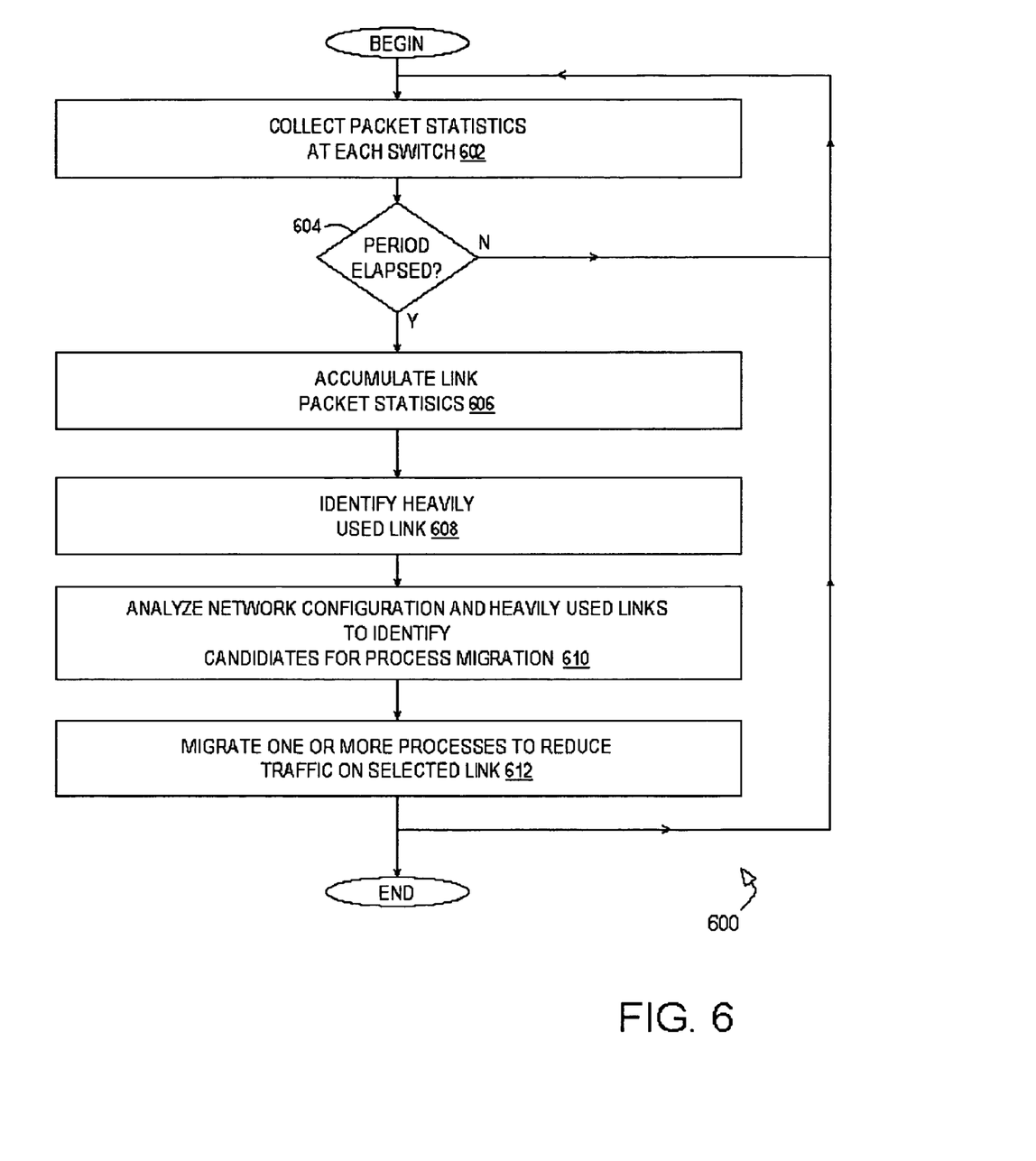
FIG. 6 is a flow diagram illustrating an implementation of a method and software code suitable for distributing processes to network nodes to minimize network and interconnect bottlenecks according to an embodiment of the invention.

Referring to FIG. 6, a flow diagram illustrating an embodiment of a method 600 for managing a network according to one embodiment of the invention is depicted. In the depicted embodiment, local packet statistics are collected (block 602) at each switch. The packet information collected in this implementation preferably includes only the number of packets traversing each link and preferably does not include source node and/or destination node of each monitored packet. The packet information may be collected and stored locally according to link pairs associated with the switch as described above with respect to FIG. 7. In the depicted embodiment, the packet statistics are collected for a specified duration or period as indicated in block 604.

At the end of each monitoring duration, which may be periodic or non-periodic depending upon the implementation, the link statistics for each switch 201-212 are collected (block 606), preferably in a central database on a node where system software 240 is stored or executing. One or more heavily used links are then identified (block 608) based upon the data in the central database.

Selection of heavily used links in this embodiment may include simply ordering or sorting the links according to the number of packets traversing each link during the preceding monitoring period. If the links statistics are monitoring and stored locally according to link pairs as described above with respect to FIG. 7, accumulation of link statistics in block 606 may include deriving individual link statistics from the link pair data by adding the counts of the appropriate link pair values. Thereafter, the one or more most heavily trafficked links are identified (block 608). The number of links identified as heavily used in each period may vary according to implementation. Some implementations may include a threshold number of packets defining a minimum number of packets required to qualify as a heavily used link. In this case, there may be monitoring duration during which none of the links qualify as heavily used (i.e., no process migration required).

In the event, however, that one or more links are identified as heavily used links based on the number of packets traversing the links, system software 240 is invoked to identify potential candidates for process migration by analyzing network configuration information, to which system software 240 has access, in conjunction with the streamlined set of link-pair data represented in FIG. 7. System software 240 may identify a migration candidate by a method desirable for its lack of complexity by determining the most likely immediately preceding switch or node and the most likely immediately following switch or node for a particular heavily used link. Referring back to the illustration of FIG. 2, for example, system software 240, after collecting the link statistics for one or more of the switches (preferably all of them), identifies link 220 as a heavily used link because it has carried more packets than any of the other links in the network.

Having so determined link 220 as a heavily used link, system software 240 may the determine the most likely immediately preceding link as the incoming link that has carried the most traffic, which information is also available in the collected link statistic information. In the illustrated example, the switch 208 that sends packet traffic over link 220 receives packets from two incoming links, namely, link 216 and link 222, which system software 240, having access to network configuration information, can determine. System software 240 then identifies a most likely immediately preceding switch by simple comparison of the number of packets on each incoming link. System software 240 may, therefore, recognize that link 216 has carried more traffic during the preceding monitoring period than link 222. System software 240 may then determine that switch 204 is the most likely immediately preceding switch for packet travel arriving at switch 208. In this manner, system software 240 can work backwards and forward from switch 208, by making successive determinations of the most likely preceding and following switches or nodes, until the software ultimately determines the most likely source node and destination node combination responsible for contributing to packet traffic on the identified heavily used link 220 is node 104 as a source and node 105 as a destination.

An interesting case is presented in the illustration by the determination of the most likely immediately preceding node or switch for switch 204 (which is itself the most likely immediately preceding switch from the switch 208 under discussion). Specifically, the packet statistics for switch 204 indicate that 30 of its packets have come from node 104 and 30 of its packets have come from node 108. Under these circumstances, system software 240 may identify both nodes, neither node, or one of the nodes (selected arbitrarily or according to a least recently selected or other algorithm) as the immediately preceding nodes. The determination of which of these alternative to purse depends on how aggressive the system administrator wants to be in identifying migration candidates.

Having made a determination of the source/node combinations that are most likely causing the bottleneck links, system software 240 may then identify one or more processes that have an association or mapping with the identified source/destination combination. System software 240 may then migrate any such process or processes to a different set of nodes, where the path between the newly identified set of source/destination nodes does not include any identified heavily used link in much the same manner that the system software described above with respect to FIG. 5 operates. In the example of FIG. 2, system software could recognize from its knowledge of the network configuration that the path from node 104 to node 105 is the most likely source/destination path contributing to traffic on link 220. The system software would then identify processes mapped to nodes 104 and/or 105, migrate them to another set of nodes if possible, and resume monitoring of packets in block 602.

It will be apparent to those skilled in the art having the benefit of this disclosure that the present invention contemplates a mechanism for managing packet traffic in a networked environment. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for managing packet traffic in a data processing network, the network being comprised of a plurality of nodes interconnected via an interconnect comprising a plurality of switches and interconnecting links, comprising:

collecting data indicative of the amount of packet traffic traversing selected links by collecting packet data for each switch in the interconnect;

generating a data table for each switch, wherein each data table includes an entry for each link pair associated with the switch, wherein each entry indicates the number of packets traversing the corresponding link pair during a monitored period, wherein each link pair entry corresponds to a unique combination of an input link and output link associated with the switch;

identifying, from the collected data, a heavily used link;

analyzing the collected data for the heavily used link to identify a source node and a destination node combination that contributes to the traffic on the heavily used link, wherein analyzing the collected data comprises identifying the most common combination of source and destination information associated; and migrating a process associated with the identified source and destination combination wherein packets generated by the migrated process traverse a path from source to destination that consists of links other than the heavily used link, wherein migrating a process associated with a source and destination combination includes migrating the process to a different source node, wherein a path connecting the different source node and the destination node does not include the heavily used link.

* * * * *